(12) United States Patent
Liu (10) Patent No.: US 11,762,601 B2
(45) Date of Patent: Sep. 19, 2023

(54) METHOD FOR ARBITRATING HETEROGENEOUS STORAGE-BASED CLUSTER, AND SYSTEM, COMPUTER DEVICE AND NON-TRANSITORY COMPUTER-READABLE MEDIUM THEREOF

(71) Applicant: INSPUR SUZHOU INTELLIGENT TECHNOLOGY CO., LTD., Jiangsu (CN)

(72) Inventor: Shuliang Liu, Jiangsu (CN)

(73) Assignee: INSPUR SUZHOU INTELLIGENT TECHNOLOGY CO., LTD., Jiangsu (CN)

( * ) Notice: Subject to any disclaimer, the term of this patent is extended or adjusted under 35 U.S.C. 154(b) by 0 days.

(21) Appl. No.: 18/020,602

(22) PCT Filed: May 27, 2021

(86) PCT No.: PCT/CN2021/096406
§ 371 (c)(1),
(2) Date: Feb. 9, 2023

(87) PCT Pub. No.: WO2022/033119
PCT Pub. Date: Feb. 17, 2022

(65) Prior Publication Data
US 2023/0229361 A1  Jul. 20, 2023

(30) Foreign Application Priority Data
Aug. 14, 2020  (CN) .......................... 202010819807.3

(51) Int. Cl.
*G06F 3/06* (2006.01)

(52) U.S. Cl.
CPC ............ *G06F 3/067* (2013.01); *G06F 3/0626* (2013.01); *G06F 3/0653* (2013.01); *G06F 3/0665* (2013.01)

(58) Field of Classification Search
None
See application file for complete search history.

(56) References Cited

U.S. PATENT DOCUMENTS

| 7,739,541 B1 * | 6/2010 | Rao ...................... G06F 11/1425 714/13 |
| 2010/0017409 A1 * | 1/2010 | Rawat ..................... H04L 41/00 707/E17.007 |
| 2010/0205273 A1 | 8/2010 | Shim |

FOREIGN PATENT DOCUMENTS

| CN | 103684941 A | 3/2014 |
| CN | 105472022 A | 4/2016 |

(Continued)

OTHER PUBLICATIONS

PCT/CN2021/096406 international search report.

*Primary Examiner* — Brian R Peugh
(74) *Attorney, Agent, or Firm* — IPRO, PLLC (57) ABSTRACT

A method for arbitrating cluster includes: setting heartbeat between every two adjacent nodes in the cluster; in response to disconnection of heartbeat among nodes occurs, dividing the nodes into a plurality of sub-clusters, and determining whether the sub-cluster having a largest number of nodes is unique; in response to the sub-cluster having the largest number is not unique, selecting one node in the sub-clusters having the largest number of nodes, to make the selected nodes send a request of reservation to a logical volume of a third-party storage; in response to success of reservation of node, determining whether data for arbitrating in the logical volume of the third-party storage is valid; and in response to the data is invalid, writing information for arbitrating of the (Continued)

node of success into the logical volume, to make the sub-cluster, to which the node belongs, obtain a control right of the cluster.

20 Claims, 4 Drawing Sheets

(56) References Cited

FOREIGN PATENT DOCUMENTS

| | | | |
|---|---|---|---|
| CN | 105656645 A | 6/2016 | |
| CN | 105704187 A | 6/2016 | |
| CN | 112003916 A | 11/2020 | |
| WO | WO-9921098 A2 * | 4/1999 | .......... G06F 11/1425 |

* cited by examiner

METHOD FOR ARBITRATING HETEROGENEOUS STORAGE-BASED CLUSTER, AND SYSTEM, COMPUTER DEVICE AND NON-TRANSITORY COMPUTER-READABLE MEDIUM THEREOF

CROSS-REFERENCE TO RELATED APPLICATION

The present disclosure claims the priority of the Chinese patent application filed on Aug. 14, 2020 before the China National Intellectual Property Administration with the application number of 202010819807.3 and the title of "CLUSTER ARBITRATION METHOD AND SYSTEM BASED ON HETEROGENEOUS STORAGE, AND DEVICE AND STORAGE MEDIUM", which is incorporated herein in its entirety by reference.

FIELD

The disclosure relates to the field of storage cluster, and more specifically, refers to a method for arbitrating a heterogeneous storage-based cluster, and a system, a computer device and a computer-readable medium thereof.

BACKGROUND

When a storage cluster is formed through a plurality of controllers, the respective controller nodes need to maintain interconnection, and states among the respective nodes, which are called heartbeats, need to be periodically queried. When the heartbeats of some nodes fail to be captured in time, this part of controller nodes may have failed, or the interconnection states among controllers have become disconnected due to for example network failure, and so on. At this time, the two parts of cluster nodes need to negotiate and confirm that the part of the cluster having more nodes will automatically obtain the control right of the cluster and kick out the other part of cluster nodes.

SUMMARY

A purpose of the embodiments of the present disclosure is to propose a method for arbitrating a heterogeneous storage-based cluster, and a system, a computer device and a computer-readable medium thereof.

For the above purpose, one aspect of the embodiments of the disclosure provides a method for arbitrating a heterogeneous storage-based cluster, including following steps: setting a heartbeat between every two adjacent nodes in the cluster; in response to that disconnection of heartbeat among nodes occurs, dividing the nodes in the cluster into a plurality of sub-clusters based on the disconnected heartbeats, and determining whether the sub-cluster having a largest number of nodes is unique; in response to that the sub-cluster having the largest number of nodes is not unique, respectively selecting one node in the respective sub-clusters having the largest number of nodes, to make the selected nodes, respectively send a request of reservation to a logical volume of a third-party storage simultaneously; in response to that success of reservation of node occurs, determining whether data for arbitrating in the logical volume of the third-party storage is valid; and in response to that the data for arbitrating in the logical volume of the third-party storage is invalid, writing information for arbitrating of the node of success of reservation into the logical volume of the third-party storage, to make the sub-cluster, to which the node belongs, obtain a control right of the cluster.

In some embodiments, the dividing the nodes in the cluster into the plurality of sub-clusters based on the disconnected heartbeats, includes: in response to that a plurality of disconnected heartbeats occur, the nodes between two disconnected heartbeats are allocated as one sub-cluster.

In some embodiments, the dividing the nodes in the cluster into the plurality of sub-clusters based on the disconnected heartbeats, includes: in response to that merely one disconnected heartbeat occurs, the nodes in the cluster are allocated as two sub-clusters based on the disconnected heartbeat.

In some embodiments, the respectively selecting one node in the respective sub-clusters having the largest number of nodes, to make the selected nodes, respectively send a request of reservation to a logical volume of a third-party storage simultaneously, includes: respectively selecting one node having a smallest ID in the respective sub-clusters having the largest number of nodes, to make the selected nodes, respectively send the request of reservation to the logical volume of the third-party storage simultaneously.

In some embodiments, the method further includes: in response to that the information for arbitrating is successfully written into the logical volume of the third-party storage, releasing reservation for the logical volume of the third-party storage.

In some embodiments, the method further includes: in response to that the sub-cluster having a control right loses the control right, the data for arbitrating is set as invalid.

In some embodiments, the method further includes: mapping the logical volume of the third-party storage to the cluster, and setting an area for arbitrating in the logical volume of the third-party storage to store the data for arbitrating.

Another aspect of the embodiments of the disclosure further provides a system for arbitrating a heterogeneous storage-based cluster, including: a heartbeat module, configured to set a heartbeat between every two adjacent nodes in the cluster; a first determination module, configured to, in response to that disconnection of heartbeat among nodes occurs, divide the nodes in the cluster into a plurality of sub-clusters based on the disconnected heartbeats, and determine whether the sub-cluster having a largest number of nodes is unique; a reservation module, configured to, in response to that the sub-cluster having the largest number of nodes is not unique, respectively select one node in the respective sub-clusters having the largest number of nodes, to make the selected nodes respectively send a request of reservation to a logical volume of a third-party storage simultaneously; a second determination module, configured to, in response to that success of reservation of node occurs, determine whether data for arbitrating in the logical volume of the third-party storage is valid; and an execution module, configured to, in response to that the data for arbitrating in the logical volume of the third-party storage is invalid, write information for arbitrating of the node of success of reservation into the logical volume of the third-party storage, to make the sub-cluster, to which the node belongs, obtain a control right of the cluster.

Still another aspect of the embodiments of the disclosure further provides a computer device for arbitrating a heterogeneous storage-based cluster, including: at least one processor; and a memory, wherein the memory stores computer instructions that is able to be run in the processor, and in response to that the instructions are executed by the processor, the steps of the above methods are realized.

Further still another aspect of the embodiments of the disclosure further provides a computer-readable storage medium, wherein the computer-readable storage medium stores a computer program, and when the computer program is executed by a processor, the steps of the above methods are realized.

BRIEF DESCRIPTION OF THE DRAWINGS

In order to more clearly illustrate the technical solutions in the embodiments of the disclosure or in the prior art, the following will briefly introduce the drawings needed to be used in illustrating the embodiments or the prior art. Apparently, the drawings in the following description are only embodiments of the disclosure. For those ordinary skilled in the field, they may further obtain other drawings according to the provided drawings without paying creative labor.

DETAILED DESCRIPTION OF THE EMBODIMENTS

In order to make the purpose, technical solution and advantages of the disclosure more distinct, the following will further describe the embodiments of the disclosure in detail with reference to the embodiments and the accompanying drawings.

It should be noted that expressions using "first" and "second" in the embodiments of the present disclosure are intended to distinguish two different entities or different parameters with the same name, therefore, "first" and "second" are only for the sake of convenience of expression, and should not be understood as limiting the embodiments of the present disclosure, which is no longer specified in the subsequent embodiments.

In related art, when numbers of the two parts of cluster nodes are the same, there is no way to determine which part of the cluster shall obtain the control right.

Figure 1:
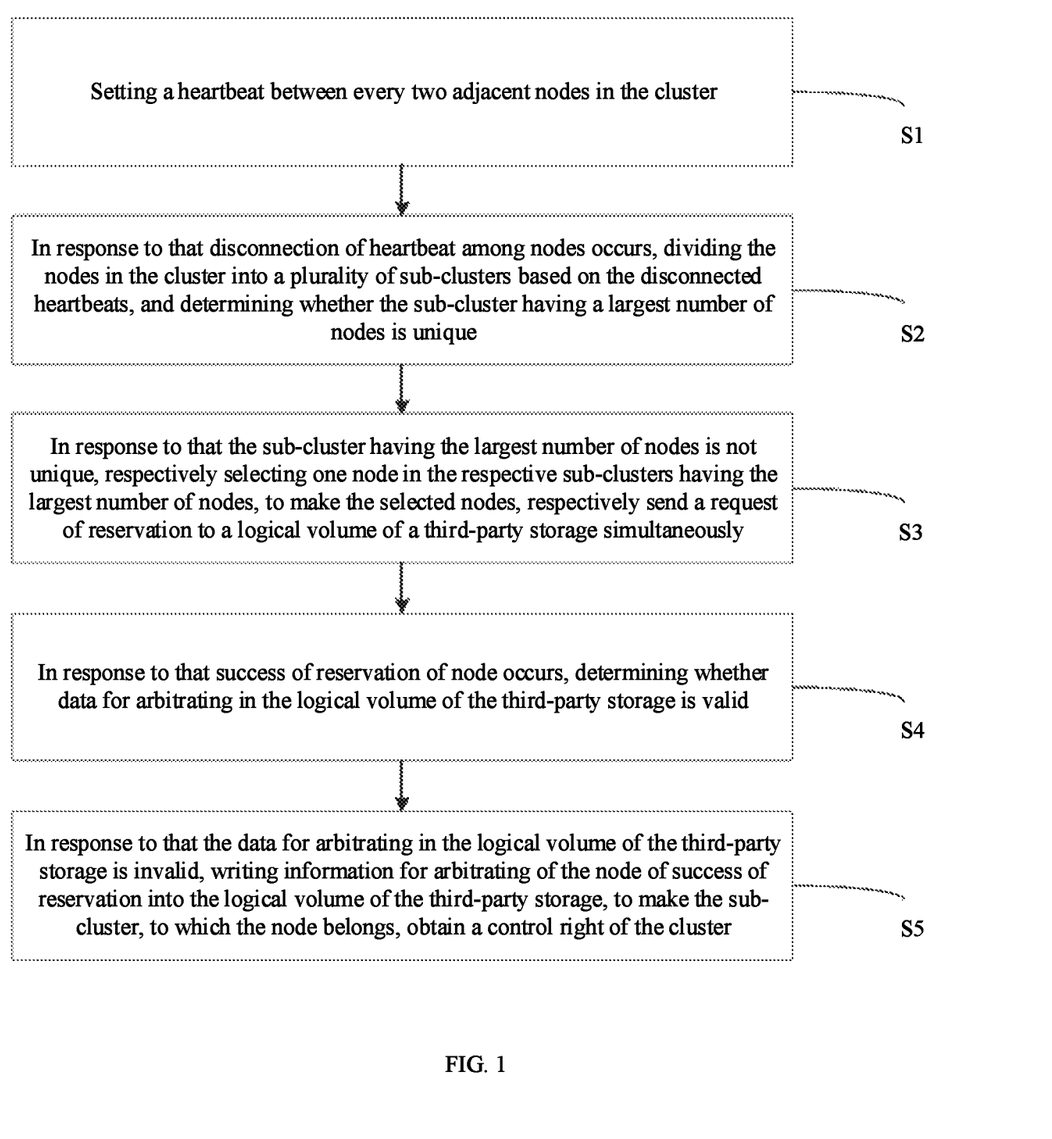
FIG. 1 is a flow chart illustrating a method for arbitrating a heterogeneous storage-based cluster provided by an embodiment of the disclosure.

For the above purpose, a first aspect of the embodiments of the disclosure proposes an embodiment of a method for arbitrating a heterogeneous storage-based cluster. FIG. 1 is a flow chart illustrating a method for arbitrating a heterogeneous storage-based cluster provided by an embodiment of the disclosure. As shown in FIG. 1, the embodiment of the disclosure includes the following steps:

S1. setting a heartbeat between every two adjacent nodes in the cluster;

S2. in response to that disconnection of heartbeat among nodes occurs, dividing the nodes in the cluster into a plurality of sub-clusters based on the disconnected heartbeats, and determining whether the sub-cluster having a largest number of nodes is unique;

S3. in response to that the sub-cluster having the largest number of nodes is not unique, respectively selecting one node in the respective sub-clusters having the largest number of nodes, to make the selected nodes, respectively send a request of reservation to a logical volume of a third-party storage simultaneously;

S4. in response to that success of reservation of node occurs, determining whether data for arbitrating in the logical volume of the third-party storage is valid; and S5. in response to that the data for arbitrating in the logical volume of the third-party storage is invalid, writing information for arbitrating of the node of success of reservation into the logical volume of the third-party storage, to make the sub-cluster, to which the node belongs, obtain a control right of the cluster.

The nodes of the cluster are connected through fiber channels (FC) or internet protocol (IP) networks, and maintain online states among each other through the heartbeats. The switch is an FC switch or IP switch, which is connected to the third-party storage and the respective nodes of and the storage cluster (i.e., the cluster). Although the third-party storage may not join the storage cluster, it may be taken over and managed by the storage cluster. The logical volume may be mapped to the storage cluster for unified management.

The third-party storage needs to support a small computer system interface (SCSI) protocol. Both attribute and data reading and writing of the logical volume may be operated through the SCSI protocol. The third-party storage supports release/reserve instructions of SCSI2 as well, for arbitration among clusters.

In some embodiments, the method further includes: mapping the logical volume of the third-party storage to the cluster, and setting an area for arbitrating in the logical volume of the third-party storage to store the data for arbitrating. Every node of the storage cluster needs to be visible to the third-party storage, and the third-party storage needs to map the logical volume to the nodes of the respective controllers (i.e., the nodes) of the storage cluster. The logical volume may be added into a storage pool of the storage cluster, and a logical volume of the storage cluster needs to be allocated from the storage pool. In addition, the logical volume of the third-party storage needs to reserve an additional capacity of 1 megabyte (MB) for cluster arbitration. The area of 1 MB may not be used for other additional purposes.

The heartbeat is set between every two adjacent nodes in the cluster. In response to that disconnection of heartbeat among nodes occurs, the nodes in the cluster are divided into a plurality of sub-clusters based on the disconnected heartbeats, and it is determined whether the sub-cluster having a largest number of nodes is unique.

In some embodiments, that the nodes in the cluster are divided into a plurality of sub-clusters based on the disconnected heartbeats, includes: in response to that a plurality of disconnected heartbeats occur, the nodes between two disconnected heartbeats are allocated as one sub-cluster. For example, there are six nodes in a cluster, which are node 1 to node 6. The six nodes are arranged in order. The heartbeat between node 2 and node 3 is disconnected, while the heartbeat between node 4 and node 5 is disconnected as well. At this time, the cluster is divided into three sub-clusters, respectively, a first sub-cluster including the node 1 and node 2, a second sub-cluster including the node 3 and node 4, and a third sub-cluster including the node 5 and node 6. Since every number of nodes in the three sub-clusters is 2, the sub-cluster having a largest number of nodes is not unique.

In some embodiments, that the nodes in the cluster are divided into a plurality of sub-clusters based on the disconnected heartbeats, includes: in response to that merely one disconnected heartbeat occurs, the nodes in the cluster are allocated as two sub-clusters based on the disconnected heartbeat. For example, there are still six nodes. When the heartbeat between node 3 and node 4 is disconnected, at this time, the cluster is divided into two sub-clusters, respectively, a first sub-cluster including the node 1 to node 3 and a second sub-cluster including the node 4 to node 6. Since every number of nodes in the two sub-clusters are 3, the sub-cluster having a largest number of nodes is not unique.

In response to that the sub-cluster having the largest number of nodes is not unique, one node in the respective sub-clusters having the largest number of nodes is respectively selected, and the selected nodes respectively send a request of reservation to a logical volume of a third-party storage simultaneously. For example, continuing with the above example, when the cluster is divided into two sub-clusters, one node in the first sub-cluster may be selected and one node in the second sub-cluster may be selected, and each of the two nodes sends the request of reservation to the logical volume of the third-party storage.

In some embodiments, that one node in the respective sub-clusters having the largest number of nodes is respectively selected and the selected nodes respectively send the request of reservation to the logical volume of the third-party storage simultaneously, includes: one node having a smallest identifier (ID) in the respective sub-clusters having the largest number of nodes is respectively selected and the selected nodes respectively send the request of reservation to the logical volume of the third-party storage simultaneously. Continuing with the above example, the node 1 in the first sub-cluster may be selected and the node 4 in the second sub-cluster may be selected, and each of the two nodes sends the request of reservation to the logical volume of the third-party storage.

In response to that success of reservation of node occurs, it is determined whether data for arbitrating in the logical volume of the third-party storage is valid. For example, after the node 1 is successfully reserved, the node 1 reads the data for arbitrating in an area of 1 MB reserved by the logical volume of the third-party storage, and determines whether the data for arbitrating is valid.

In response to that the data for arbitrating in the logical volume of the third-party storage is invalid, information for arbitrating of the node of success of reservation is written into the logical volume of the third-party storage, to make a control right of the cluster be obtained. If the data for arbitrating is invalid, the node of success of reservation re-writes the information for arbitrating into the area of 1 MB reserved by the logical volume of the third-party storage. The information for arbitrating includes information, for example, a time point of the arbitrating, a flag bit indicating whether valid or not, and the nodes of the arbitrating, and so on.

In some embodiments, the method further includes: in response to that the information for arbitrating is successfully written into the logical volume of the third-party storage, releasing the reservation for the logical volume of the third-party storage. After the data for arbitrating has been completely written, a release command is sent to release a reserve action for the logical volume of the third-party storage.

In some embodiments, the method further includes: in response to that the sub-cluster having a control right loses the control right, the data for arbitrating is set as invalid.

When the node 4 of another storage cluster sends a reserve command after the node 1 is successfully reserved and before the node 1 releases the reservation, the third-party storage will return SCSI State 18 h RESERVATION CONFLICT according to the protocol, that is, the reserve command fails, and the cluster to which the node 4 belongs fails in preempting the control right. When the node 4 sends the reserve command after the node 1 releases the reservation, the reservation of the node 4 will be succeed. At this time, node 4 will read the data for arbitrating in the area of 1 MB reserved by the logical volume of the third-party storage. If the node 4 finds that the data for arbitrating is valid, the cluster to which the node 4 belongs will fail in preempting the control right as well.

It should be pointed out that the respective steps in the methods for arbitrating the heterogeneous storage-based cluster in the respective embodiments may be crossed, replaced, added and deleted. Therefore, these reasonable permutations, combinations and transformations for the methods for arbitrating the heterogeneous storage-based cluster shall fall within the scope of protection of the disclosure as well, and the scope of protection of the disclosure shall not be limited to the embodiments.

Figure 2:
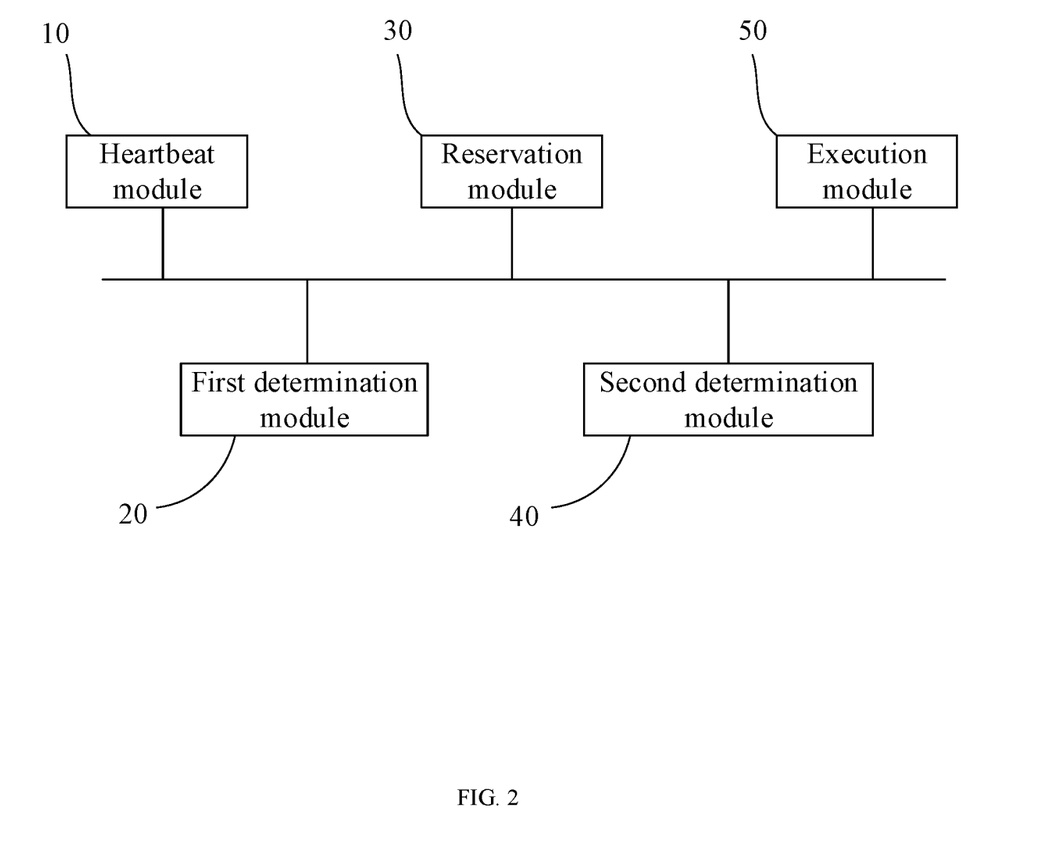
FIG. 2 is a schematic diagram illustrating a system for arbitrating a heterogeneous storage-based cluster provided by an embodiment of the disclosure.

For the above purpose, a second aspect of the embodiments of the disclosure proposes a system for arbitrating a heterogeneous storage-based cluster, as shown in FIG. 2, the system includes: a heartbeat module 10, configured to set a heartbeat between every two adjacent nodes in the cluster; a first determination module 20, configured to, in response to that disconnection of heartbeat among nodes occurs, divide the nodes in the cluster into a plurality of sub-clusters based on the disconnected heartbeats, and determine whether the sub-cluster having a largest number of nodes is unique; a reservation module 30, configured to, in response to that the sub-cluster having the largest number of nodes is not unique, respectively select one node in the respective sub-clusters having the largest number of nodes, to make the selected nodes respectively send a request of reservation to a logical volume of a third-party storage simultaneously; a second determination module 40, configured to, in response to that success of reservation of node occurs, determine whether data for arbitrating in the logical volume of the third-party storage is valid; and an execution module 50, configured to, in response to that the data for arbitrating in the logical volume of the third-party storage is invalid, write information for arbitrating of the node of success of reservation into the logical volume of the third-party storage, to make the sub-cluster, to which the node belongs, obtain a control right of the cluster.

In some embodiments, the first determination module 20 is configured to, in response to that a plurality of disconnected heartbeats occur, the nodes between two disconnected heartbeats are allocated as one sub-cluster.

In some embodiments, the first determination module 20 is configured to, in response to that merely one disconnected heartbeat occurs, the nodes in the cluster are allocated as two sub-clusters based on the disconnected heartbeat.

In some embodiments, the reservation module 30 is configured to, respectively select one node having a smallest ID in the respective sub-clusters having the largest number of nodes, to make the selected nodes respectively send the request of reservation to the logical volume of the third-party storage simultaneously.

In some embodiments, the system further includes: a release module, configured to, in response to that the information for arbitrating is successfully written into the logical volume of the third-party storage, release the reservation for the logical volume of the third-party storage.

In some embodiments, the system further includes: an invalid module, configured to, in response to that the sub-cluster having a control right loses the control right, set the data for arbitrating as invalid.

In some embodiments, the system further includes: a mapping module, configured to map the logical volume of the third-party storage to the cluster, and set an area for arbitrating in the logical volume of the third-party storage to store the data for arbitrating.

Based on the above purpose, a third aspect of the embodiment of the disclosure proposes a computer device, including: at least one processor; and a memory, wherein the memory stores computer instructions that may be run in the processor, and the instructions are executed by the processor to realize the following steps: S1. setting a heartbeat between every two adjacent nodes in the cluster; S2. in response to that disconnection of heartbeat among nodes occurs, dividing the nodes in the cluster into a plurality of sub-clusters based on the disconnected heartbeats, and determining whether the sub-cluster having a largest number of nodes is unique; S3. in response to that the sub-cluster having the largest number of nodes is not unique, respectively selecting one node in the respective sub-clusters having the largest number of nodes, to make the selected nodes, respectively send a request of reservation to a logical volume of a third-party storage simultaneously; S4. in response to that success of reservation of node occurs, determining whether data for arbitrating in the logical volume of the third-party storage is valid; and S5. in response to that the data for arbitrating in the logical volume of the third-party storage is invalid, writing information for arbitrating of the node of success of reservation into the logical volume of the third-party storage, to make the sub-cluster, to which the node belongs, obtain a control right of the cluster.

In some embodiments, in response to that disconnection of heartbeat among nodes occurs, dividing the nodes in the cluster into a plurality of sub-clusters based on the disconnected heartbeats, includes: in response to that a plurality of disconnected heartbeats occur, the nodes between two disconnected heartbeats are allocated as one sub-cluster.

In some embodiments, in response to that disconnection of heartbeat among nodes occurs, dividing the nodes in the cluster into a plurality of sub-clusters based on the disconnected heartbeats, includes: in response to that merely one disconnected heartbeat occurs, the nodes in the cluster are allocated as two sub-clusters based on the disconnected heartbeat.

In some embodiments, respectively selecting one node in the respective sub-clusters having the largest number of nodes, to make the selected nodes, respectively send a request of reservation to a logical volume of a third-party storage simultaneously, includes: one node having a smallest ID in the respective sub-clusters having the largest number of nodes is respectively selected and the selected nodes respectively send the request of reservation to the logical volume of the third-party storage simultaneously.

In some embodiments, the instructions are executed by the processor to realize the following step: in response to that the information for arbitrating is successfully written into the logical volume of the third-party storage, releasing the reservation for the logical volume of the third-party storage.

In some embodiments, the instructions are executed by the processor to realize the following step: in response to that the sub-cluster having a control right loses the control right, the data for arbitrating is set as invalid.

In some embodiments, the instructions are executed by the processor to realize the following step: mapping the logical volume of the third-party storage to the cluster, and setting an area for arbitrating in the logical volume of the third-party storage to store the data for arbitrating.

Figure 3:
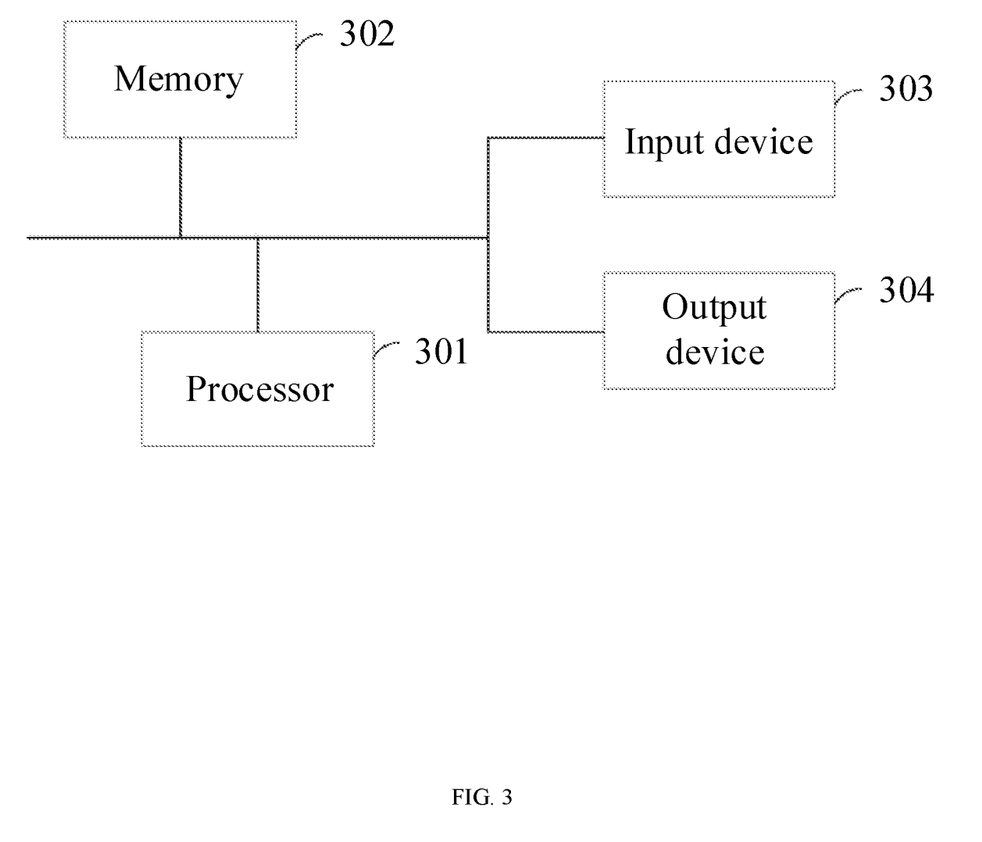
FIG. 3 is a schematic diagram illustrating a hardware structure of a computer device for arbitrating a heterogeneous storage-based cluster provided by an embodiment of the disclosure.

As shown in FIG. 3, it is a schematic diagram illustrating a hardware structure of a computer device for arbitrating a heterogeneous storage-based cluster provided by an embodiment of the disclosure.

Taking the device shown in FIG. 3 as an example, the device includes a processor 301 and a memory 302, and may further include an input device 303 and an output device 304.

The processor 301, the memory 302, the input device 303 and the output device 304 may be connected through a bus or other means, and it takes a bus connection as an example in FIG. 3.

The memory 302, as a non-volatile computer-readable storage medium, may be used to store non-volatile software programs, non-volatile computer-executable programs and modules, for example, program instructions/modules corresponding to the methods for arbitrating the heterogeneous storage-based cluster in the respective embodiments of the disclosure. The processor 301 executes various functional applications and data processing of a server by running non-volatile software programs, instructions and modules stored in the memory 302, that is, to realize the methods for arbitrating the heterogeneous storage-based cluster in the above embodiments of the disclosure.

The memory 302 may include a program storage area and a data storage area, wherein the program storage area may store an operating system and an application program required by at least one function. The data storage area may store the data created according to the use of the methods for arbitrating the heterogeneous storage-based cluster. In addition, the memory 302 may include a high-speed random access memory, and may further include a non-volatile memory, for example, at least one of a disk storage device, a flash memory device, or other non-volatile solid-state storage device. In some embodiments, the memory 302 may include memory set remotely relative to the processor 301, which may be connected to a local module through a network. Examples of the above networks include but are not limited to the Internet, an enterprise intranet, a local area network, a mobile communication network and the combination thereof.

The input device 303 may receive input information, for example, a user name, a password, and so on. The output device 304 may include a display device, for example, a display screen, and so on.

The program instructions/modules corresponding to one or more methods for arbitrating the heterogeneous storage-based cluster are stored in the memory 302. When the program instructions/modules are executed by the processor 301, they implement the methods for arbitrating the heterogeneous storage-based cluster in the above embodiments of the disclosure.

Any one embodiment of the computer device that implements the above method for arbitrating the heterogeneous storage-based cluster may achieve the same or like effect as the corresponding methods of any of the above embodiments.

Figure 4:
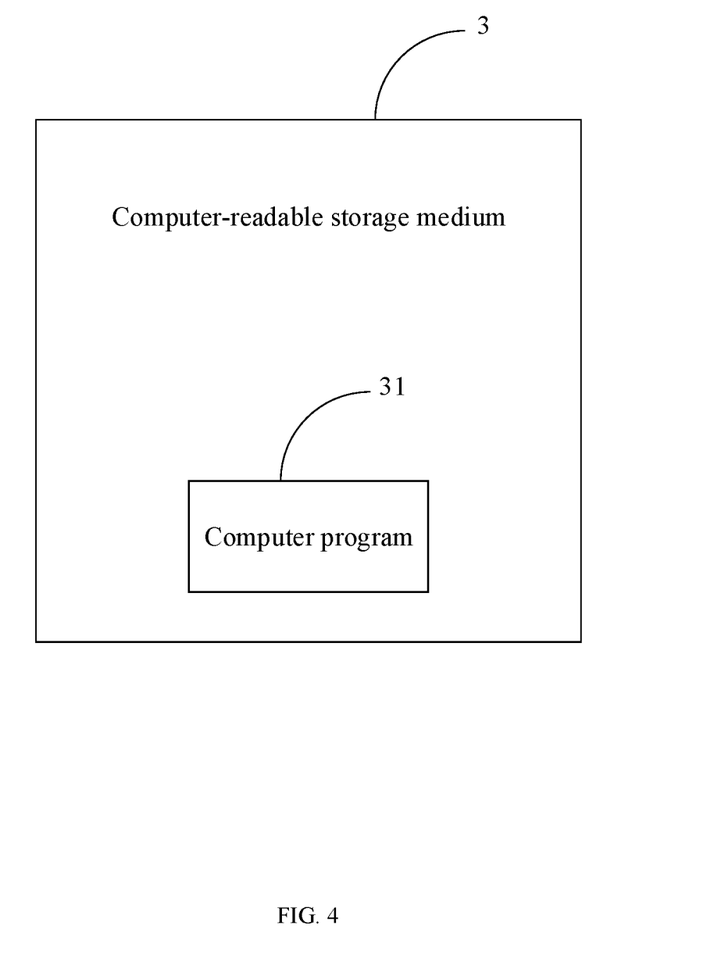
FIG. 4 is a schematic diagram illustrating a computer storage medium for arbitrating a heterogeneous storage-based cluster provided by an embodiment of the disclosure.

The disclosure further provides a computer-readable storage medium 3, as shown in FIG. 4, the computer-readable storage medium 3 stores a computer program 31 that may execute the above methods when the computer program 31 is executed by a processor.

The disclosure has following beneficial technical effects: by setting a logical volume of a third-party storage, the cluster, which shall obtain a control right, is arbitrated and determined, operation of which is simple, and it fully utilizes existing configuration, such that it is able to realize arbitration of the storage cluster without occupying additional network bandwidth.

Finally, it should be noted that those ordinary skilled in the art may understand that implementing all or a part of processes in the above embodiments may be completed by a computer program instructing relevant hardware. The program of the method for arbitrating the heterogeneous storage-based cluster may be stored in a computer-readable storage medium. When the program is executed, it may include the processes of the methods of the above embodiments. Among them, the storage medium of the program may be magnetic disk, optical disk, read-only storage memory (ROM) or random storage memory (RAM). The embodiments of the above computer program may achieve the same or like effect as the corresponding methods of any of the above embodiments.

The above are exemplary embodiments disclosed by the disclosure. However, it should be noted that a variety of changes and modifications may be made without departing from the scope disclosed by the embodiments of the disclosure defined in the claims. The functions, steps and/or actions of the method claims according to the disclosed embodiments described herein need not be performed in any particular order. In addition, although the elements disclosed in the embodiments of the disclosure may be described or required in individual form, they may further be understood as being plural, unless explicitly limited to being singular.

It should be understood that, as used herein, the singular form "one" is intended to include the plural form, unless the context clearly supports exceptions. It should further be understood that "and/or" used herein refers to any and all possible combinations of one or more items listed in association.

The above embodiment of the disclosure discloses the embodiment number only for description, and does not represent the advantages and disadvantages of the embodiments.

Those ordinary skilled in the art may understand that all or a part of the steps to implement the above embodiments may be completed by hardware, or by a program instructing related hardware. The program may be stored in a computer-readable storage medium, and the storage medium mentioned above may be read-only memory, disk or optical disk, and so on.

Those ordinary skilled in the art should understand that the discussion of any of the above embodiments is only illustrative and is not intended to imply that the scope disclosed by the embodiments of the disclosure (including claims) is limited to these examples. Under the thoughts of the embodiments of the disclosure, the technical features of the above embodiments or different embodiments may be further combined, and there are many other changes in different aspects of the above embodiments of the disclosure, which are not provided in details for simplicity. Therefore, any omission, modification, equivalent replacement, improvement, and so on, made in the spirit and principle of the embodiments of the disclosure shall be included in the protection scope of the embodiments of the disclosure.

The invention claimed is:

1. A method for arbitrating a heterogeneous storage-based cluster, comprising:
   setting a heartbeat between every two adjacent nodes in the storage-based cluster;
   in response to that disconnection of heartbeat among nodes occurs, dividing the nodes in the storage-based cluster into a plurality of sub-clusters based on the disconnected heartbeats, and determining whether the sub-cluster having a largest number of nodes is unique;
   in response to one of the sub-cluster having the largest number of nodes is not unique, respectively selecting one node in each of the sub-clusters having the largest number of nodes, to send a request of reservation to a logical volume of a third-party storage simultaneously;
   in response to that success of reservation of node occurs, determining whether data for arbitrating in the logical volume of the third-party storage is valid; and
   in response to that the data for arbitrating in the logical volume of the third-party storage is invalid, writing information for arbitrating of the node of success of reservation into the logical volume of the third-party storage, to make the sub-cluster, to which the node belongs, obtain a control right of the storage-based cluster.

2. The method according to claim 1, wherein the dividing the nodes in the storage-based cluster into the plurality of sub-clusters based on the disconnected heartbeats, comprises:
   in response to that a plurality of disconnected heartbeats occur, the nodes between two disconnected heartbeats are allocated as one sub-cluster.

3. The method according to claim 1, wherein the dividing the nodes in the storage-based cluster into the plurality of sub-clusters based on the disconnected heartbeats, comprises:
   in response to that merely one disconnected heartbeat occurs, the nodes in the storage- based cluster are allocated as two sub-clusters based on the disconnected heartbeat.

4. The method according to claim 1, wherein the respectively selecting one node in the respective sub-clusters having the largest number of nodes, to make the selected nodes, respectively send a request of reservation to a logical volume of a third-party storage simultaneously, comprises:
   respectively selecting one node having a smallest ID in the respective sub-clusters having the largest number of nodes, to make the selected nodes, respectively send the request of reservation to the logical volume of the third-party storage simultaneously.

5. The method according to claim 1, further comprising:
   in response to that the information for arbitrating is successfully written into the logical volume of the third-party storage, releasing reservation for the logical volume of the third-party storage.

6. The method according to claim 5, wherein the in response to that the information for arbitrating is successfully written into the logical volume of the third-party storage, releasing reservation for the logical volume of the third-party storage, comprises:
   after the data for arbitrating has been completely written, a release command is sent to release a reserve action for the logical volume of the third-party storage.

7. The method according to claim 5, wherein, in response to that the node of a sub-cluster sends a reserve command after the node of another sub-cluster is successfully reserved and before the node of the another sub-cluster releases the reservation, the third-party storage returns SCSI State 18 h RESERVATION CONFLICT.

8. The method according to claim 7, wherein, in response to that the third-party storage returns SCSI State 18 h RESERVATION CONFLICT, the reserve command sent by the node of the sub-cluster fails, and the sub-cluster to which the node belongs fails in preempting the control right.

9. The method according to claim 5, wherein, in response to that the node of a sub-cluster sends a reserve command after the node of another sub-cluster releases the reservation, the reserve command sent by the node of the sub-cluster is able to be succeed.

10. The method according to claim 9, wherein, in response to that the reserve command sent by the node of the sub-cluster is succeed, the node of the sub-cluster is able to read the data for arbitrating in an area reserved by the logical volume of the third-party storage, and in response to that the node of the sub-cluster finds that the data for arbitrating is valid, the sub-cluster to which the node belongs fails in preempting the control right.

11. The method according to claim 1, further comprising:
in response to that the sub-cluster having a control right loses the control right, the data for arbitrating is set as invalid.

12. The method according to claim 1, further comprising:
mapping the logical volume of the third-party storage to the storage-based cluster, and setting an area for arbitrating in the logical volume of the third-party storage to store the data for arbitrating.

13. A computer device for arbitrating a heterogeneous storage-based cluster, comprising:
at least one processor; and
a memory, wherein the memory stores computer instructions that is able to be run in the processor, and in response to that the computer instructions are executed by the processor, the processor is configure to:
set a heartbeat between every two adjacent nodes in the storage-based cluster;
in response to that disconnection of heartbeat among nodes occurs, divide the nodes in the storage-based cluster into a plurality of sub-clusters based on the disconnected heartbeats, and determine whether the sub-cluster having a largest number of nodes is unique;
in response to one of the sub-cluster having the largest number of nodes is not unique, respectively select one node in each of the sub-clusters having the largest number of nodes, to send a request of reservation to a logical volume of a third-party storage simultaneously;
in response to that success of reservation of node occurs, determine whether data for arbitrating in the logical volume of the third-party storage is valid; and
in response to that the data for arbitrating in the logical volume of the third-party storage is invalid, write information for arbitrating of the node of success of reservation into the logical volume of the third-party storage, to make the sub-cluster, to which the node belongs, obtain a control right of the storage-based cluster.

14. A non-transitory computer-readable storage medium, wherein the non-transitory computer-readable storage medium stores a computer program, and when the computer program is executed by a processor, the processor performs steps of:
setting a heartbeat between every two adjacent nodes in the storage-based cluster;
in response to that disconnection of heartbeat among nodes occurs, dividing the nodes in the storage-based cluster into a plurality of sub-clusters based on the disconnected heartbeats, and determining whether the sub-cluster having a largest number of nodes is unique;
in response to one of the sub-cluster having the largest number of nodes is not unique, respectively selecting one node in each of the sub-clusters having the largest number of nodes, to send a request of reservation to a logical volume of a third-party storage simultaneously;
in response to that success of reservation of node occurs, determining whether data for arbitrating in the logical volume of the third-party storage is valid; and
in response to that the data for arbitrating in the logical volume of the third-party storage is invalid, writing information for arbitrating of the node of success of reservation into the logical volume of the third-party storage, to make the sub-cluster, to which the node belongs, obtain a control right of the storage-based cluster.

15. The method according to claim 1, wherein the nodes of the storage-based cluster maintain online states among each other through the heartbeats.

16. The method according to claim 1, wherein the third-party storage is able to be taken over and managed by the storage-based cluster, and the logical volume may be mapped to the storage-based cluster for unified management.

17. The method according to claim 1, wherein the third-party storage supports a small computer system interface (SCSI) and SCSI2 protocol.

18. The method according to claim 1, wherein the respective nodes of the storage-based cluster are visible to the third-party storage, and the third-party storage maps the logical volume to the respective nodes of the storage-based cluster.

19. The method according to claim 1, wherein the logical volume is able to be added into a storage pool of the storage-based cluster, and a logical volume of the storage-based cluster is allocated from the storage pool.

20. The method according to claim 1, wherein the information for arbitrating comprises information of: a time point of the arbitrating, a flag bit indicating whether valid or not, and the nodes of the arbitrating.

* * * * *